(12) United States Patent
Dehghan et al.

(10) Patent No.: US 6,614,851 B1
(45) Date of Patent: Sep. 2, 2003

(54) EFFICIENT ALGORITHM FOR BLIND DETECTION OF SIGNAL CONSTELLATION

(75) Inventors: Hossein Dehghan, Danville, CA (US); Ramon A. Cruz, Fremont, CA (US); Jing Li, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 627 days.

(21) Appl. No.: 09/615,890

(22) Filed: Jul. 14, 2000

(51) Int. Cl.[7] .................................................. H04L 5/12
(52) U.S. Cl. ........................ 375/261; 375/264; 375/353
(58) Field of Search ................................. 375/261, 264, 375/329, 332, 353; 329/304

(56) References Cited

U.S. PATENT DOCUMENTS 5,243,624 A * 9/1993 Paik et al. ................... 375/232
6,167,095 A * 12/2000 Furukawa et al. ........... 375/285
6,304,593 B1 * 10/2001 Alouini et al. .............. 375/216

\* cited by examiner

Primary Examiner—Don N. Vo
(74) Attorney, Agent, or Firm—Thelen Reid & Priest LLP

(57) ABSTRACT

A method for determining the signal constellation of a received signal establishes a moment based on each waveform, squares the moment, fourth powers the moment, divides the fourth power by the square to obtain a ratio, and compares the ratio to a threshold. If the ratio is less than threshold, the signal constellation corresponds to a first type, and if greater than the threshold, the signal constellation corresponds to a second type. The method can be generalized to a magnitude mean in place of a second moment.

28 Claims, 3 Drawing Sheets

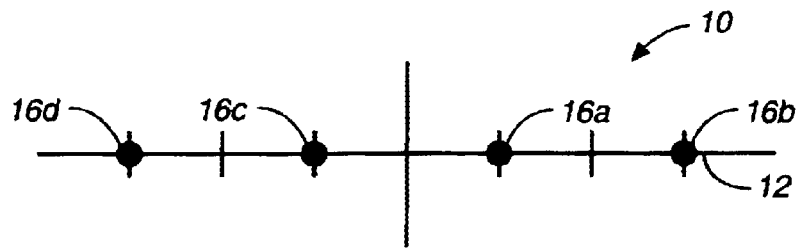
FIG._1
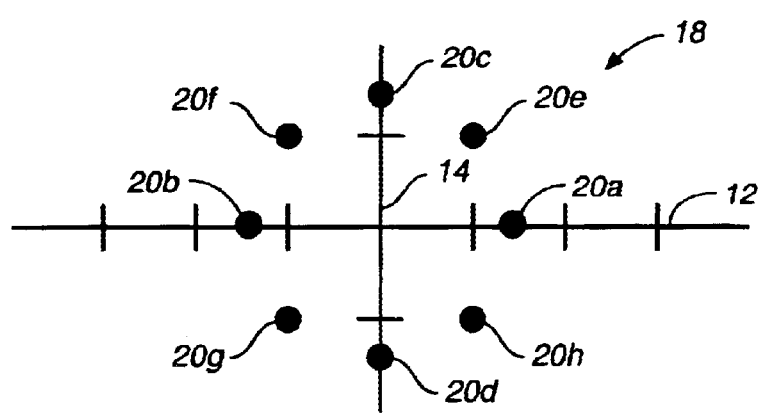
FIG._2
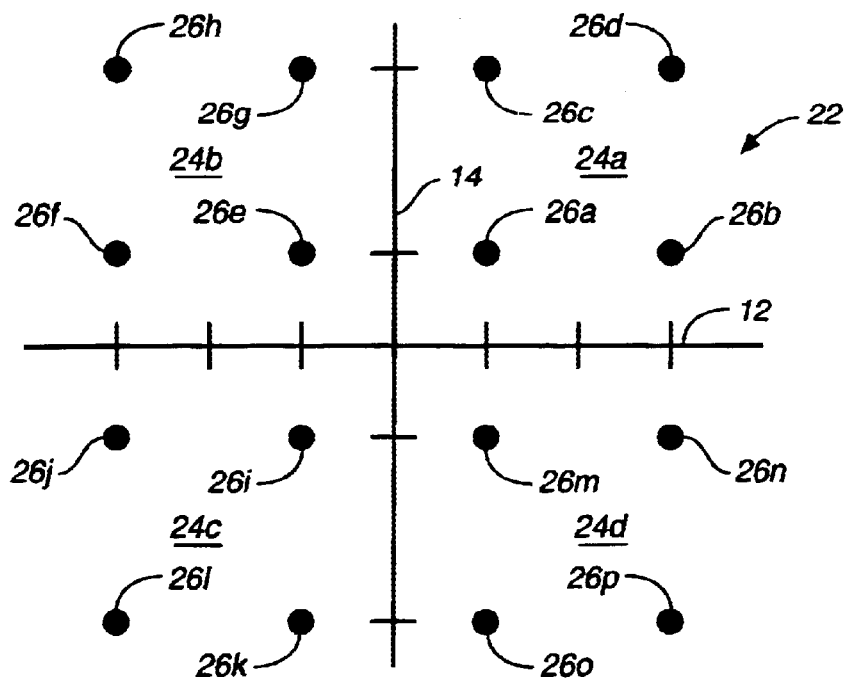
FIG._3

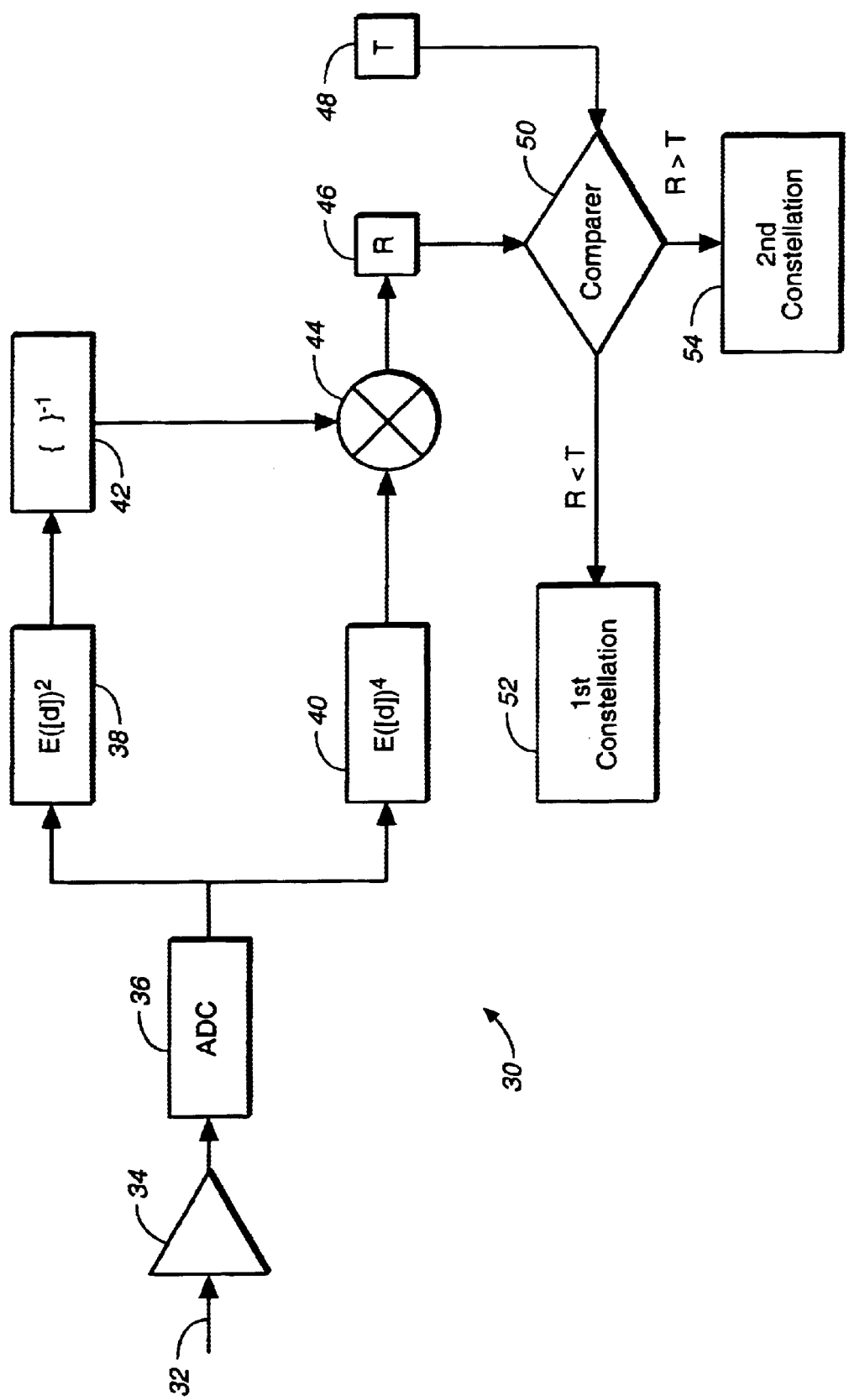
FIG._4

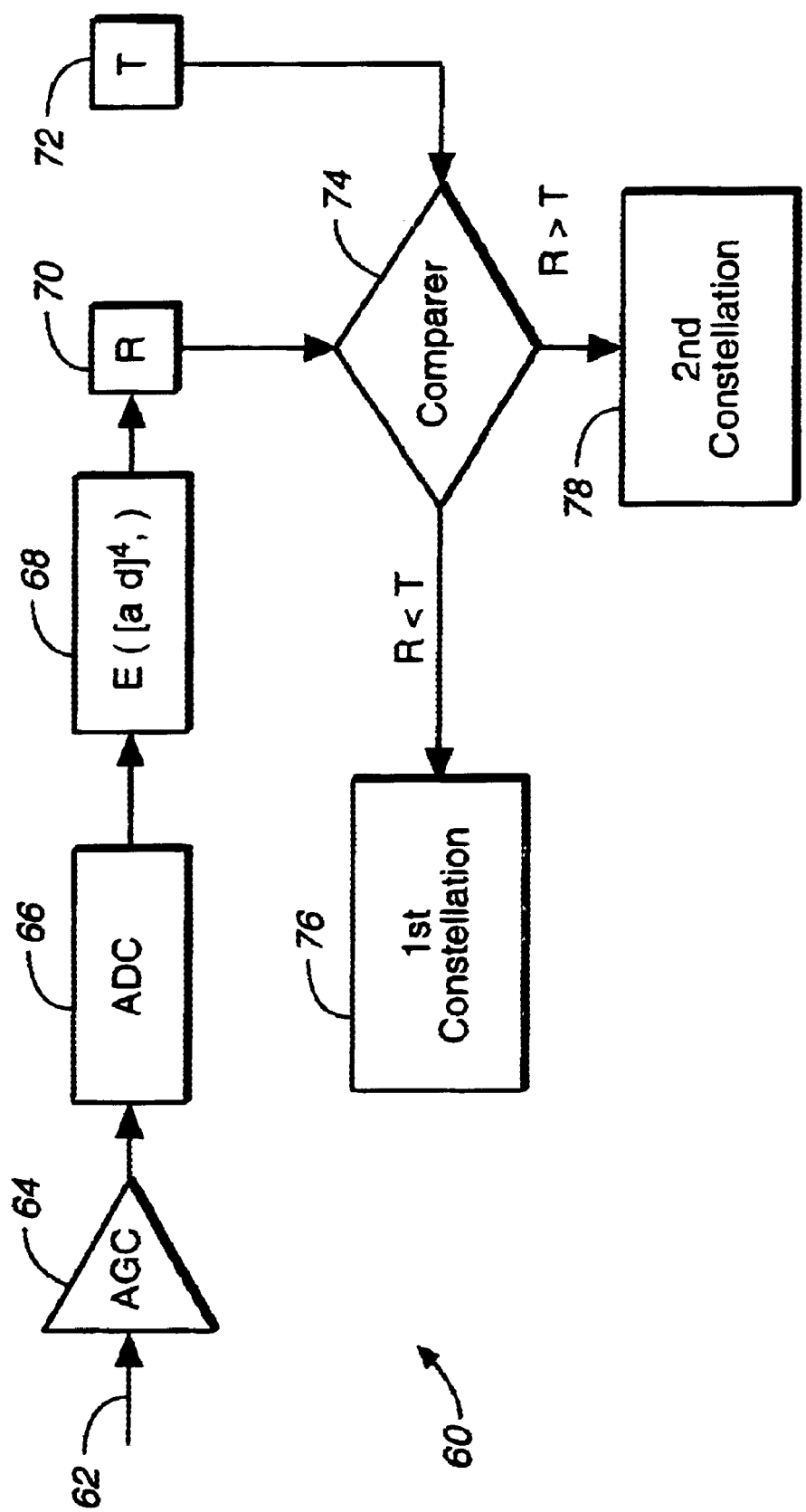
FIG._5

EFFICIENT ALGORITHM FOR BLIND DETECTION OF SIGNAL CONSTELLATION

BACKGROUND OF THE INVENTION

1. Field of the Invention

The present invention is generally directed to a method to identify the constellation type of a modulated signal.

2. Background

Communication systems employ a variety of signal modulation. These include frequency independent types such as pulse amplitude modulated (PAM) signals, quadrature amplitude modulation (QAM) and phase-shift keying (PSK).

The number of discrete waveforms may be denoted as M points in the state space constellation. In PAM, the ergodic (i.e., time-dependent) signal waveform $s_m(t)$ may be represented by a periodic cosine function that includes a series of discrete amplitudes ranging from m=1, 2, ..., M. For pulsed signals sent over discrete time intervals, the time t may be replaced by nT where T is the sampling period and n is a positive integer. PAM is similar to vestigial side band (VSB) used in television. The M-PAM signals may be plotted in single dimensioned signal space R (also written as R) at M discrete points along the real axis. The energy for the waveforms may be a proportional to the square of the amplitudes.

FIG. 1 shows a 4-PAM signal space diagram 10 with an axis 12 for example M=4. The data points are presented for a binary bit pair having four possible positions at points 16a and 16b on the left side of the imaginary axis and 16c and 16d on the right side in this example. Phase modulated signals, such as PSK and QAM, may be multi-dimensional belonging to signal space $R^N$, where N represents the dimension superscript.

For N=2, there exist real and imaginary components for representing amplitude and phase. A distance d from the origin of a point on the two-dimensional signal grid in $R^2$ can be expressed in complex form as $d=d_i+jd_q$ where $d_i$ is the in-phase or real component, $d_q$ is the quadrature or imaginary component and $j=\sqrt{-1}$.

In PSK, the signal waveforms $s_m(t)$ have equal energy and can be plotted as being equal distant from the origin. FIG. 2 shows an 8-PSK signal space diagram 18 for M=8 with data points 20a and 20b on the real axis 12, 20c and 20d on the imaginary axis 14, and 20e, 20f, 20g, and 20h at intermediate positions.

QAM may include a series of discrete amplitudes in addition to a phase component to distinguish a set of four points by the quadrant occupied. FIG. 3 shows a 16-QAM signal space diagram 22 for M=16 with the axes 12 and 14 dividing the space into four quadrants 24a, 24b, 24c and 24d. The first quadrant 24a includes four points 26a, 26b, 26c and 26d. The second quadrant 24b includes four points 26e, 26f, 26g and 26h. The third quadrant 24c includes four points 26i, 26j, 26k and 26l. The fourth quadrant 24d includes four points 26m, 26n, 26o and 26p.

For M=4, data values to be represented may range from two-digit binary numbers $00_2$, $01_2$, $10_2$, and $11_2$. For M=8, data values to be represented may range from three-digit binary numbers $000_2$, $001_2$, $010_2$, ..., $111_2$. For M=16, data values to be represented may range from four-digit binary numbers $0000_2$, $0001_2$, $0010_2$, ..., $1111_2$. The incoming signal to be interpreted as these data values may be received as voltages or digital numbers, with each discrete data value corresponding to a particular range of voltages.

Several communication transmission media are widely in use today, such as satellite, microwave, terrestrial, and cable systems. These transmit data at a variety of data rates. In order to convert the signals from received voltages into data, their amplitude and phase must be resolved. This task may be complicated by electronic noise from a variety of sources. A receiver configured to resolve only a select signal constellation would be unable to resolve an alternate modulation constellation. Smaller integrated chips could allow a wider variety of modulation systems to be received, if these are identified by modulation type. Accordingly, there exists a need for accurate and efficient detection of the modulation constellation type of a signal to enable multi-mode multi-standard operation of communication receivers.

SUMMARY OF THE INVENTION

A method for determining the signal constellation of a received signal establishes a moment based on each waveform, squares the moment, fourth powers the moment, divides the fourth power by the square to obtain a ratio, and compares the ratio to a threshold. If the ratio is less than threshold, the signal constellation corresponds to a first type, and if greater than the threshold, the signal constellation corresponds to a second type. The method can be generalized to a magnitude mean in place of a second moment.

BRIEF DESCRIPTION OF THE DRAWINGS

FIG. 1 is a plot diagram of a 4-PAM state space.

FIG. 2 is a plot diagram of an 8-PSK state space.

FIG. 3 is a plot diagram of a 16-QAM state space.

FIG. 4 is a block diagram of a constellation determiner by the moment ratio according to a specific embodiment of the present invention.

FIG. 5 is a block diagram of a normalized constellation determiner according to a specific embodiment of the present invention.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons having the benefit of this disclosure.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herein.

The present invention relates to a method to determine the constellation type for modulation of a received signal. The method may be used in a receiver of a communications system employing different types of modulations. Examples of such systems include, but are not limited to, multiple data rate systems, adaptive data rate systems and multi-resolution modulation systems. These can be found in satellite, microwave, terrestrial and cable communication systems along with broadcast channels, digital subscriber loops and various size networks. The method may also be used in universal types of receivers designed to operate for multiple applications. Such receivers may be reconfigured according to the modulation system employed. Examples of such universal receiver systems are those used in television set-top boxes that can receive VSB, M-QAM and M-PSK depending on the transmission medium and communication standard used. The method may be used in conjunction with any form of timing and carrier synchronization. It may also be used with equalization used in channel receivers.

The inventive method may ascertain the modulation without the need for recovery of carrier identification. The channel intersymbol interference may be treated as additive white Gaussian noise, irrespective of the channel noise level. The symbol timing is assumed to be recovered and the data available at the symbol rate.

The waveform series $s_m(nT)$ for $m=1, 2, \ldots, M$ may be characterized by an average voltage s. The series of these signal waveform may be expressed as an expected value function of its average $E(|s|)$ representing an aggregate absolute voltage of the received signals. The function E may also signify the equivalent low pass filtering operation of the waveforms.

The power of the signal may be expressed as a second order moment of the waveform. For the power, the expected value function $E(s^2)$ may be taken for the series of the square of the waveform. The variance of signal power may be expressed as a fourth order moment of the waveform. For the signal power variance, the expected value function $E(s^4)$ may be taken for the series of the fourth power of the waveform. By dividing the variance function by the power function, a moment ratio R may be expressed by the following relation:

$$R = \frac{E(s(nT)^4)}{E(s(nT)^2)}$$

Signals arranged in an M-PSK constellation have a constant envelope, i.e., identical distance or moment d of the constellation points from the signal space origin. Since the waveform average s may be replaced the combined or average absolute distance $|d|$, the resulting expected value function $E(|d|)$ may be treated as proportional to a constant $d_c$. Consequently, M-PSK signals have the same second and fourth order moments irrespective of the number of constellation points M. This allows a PSK moment ratio to be reduced to $R=d_c^4/d_c^2=d_c^2$.

Signals such as QAM, PAM and VSB may exhibit different second and fourth order moment characteristics for increasing numbers of constellation points. As M increases, points may disperse on the signal grid. For example, points for 8-QAM may be located at $\pm 1\pm j$ and $\pm 3\pm j$. Due to the differing distances from the origin, the points in these constellations have non-uniform second order moments, and by extension non-uniform fourth order moments. Power and variance functions may vary from one point to another within a constellation. Consequently, as the number of points M within a constellation expands, the E functions monotonically increase for these modulated signals. The moment ratio R may thus be treated as a unique value for each M-QAM and M-PAM constellation, and distinguished from the PSK values of R.

A comparison of expected value functions and the moment ratio for selected modulations is shown in Table 1. Each constellation type includes the number of constellation points M and modulation technique. The constellation type is described by point distances from the origin, the expected value function of that distance, the function with respect to the square of the distance, the function with respect to the fourth power of the distance, and the moment ratio.

TABLE 1

| Const. Type | $|d|$ | $E(|d|)$ | $E(d^2)$ | $E(d^4)$ | R |
|---|---|---|---|---|---|
| 2-PSK | $\|1 + j\| = \pm\sqrt{2}$ | $\sqrt{2}$ | 2 | 4 | 2.0 |
| 4-PSK | $\pm\sqrt{2}$ | $\sqrt{2}$ | 2 | 4 | 2.0 |
| 8-PSK | $\pm\sqrt{2}$ | $\sqrt{2}$ | 2 | 4 | 2.0 |
| 4-PAM | $\pm 1, \pm 3$ | 4 | 5 | 41 | 8.2 |
| 8-PAM | $\pm 1, \pm 3, \pm 5, \pm 7$ | 8 | 21 | 777 | 37.0 |
| 16-PAM | $\pm 1, \pm 3, \ldots \pm 15$ | 16 | 85 | 12,937 | 152.2 |
| 16-QAM | $\pm\sqrt{2}, \pm\sqrt{10}, \pm 3\sqrt{2},$ $\pm\sqrt{26}, \pm\sqrt{34}, \pm 5\sqrt{2}$ | 4 | 10 | 132 | 13.2 |
| 64-QAM | $\pm\sqrt{2}, \pm\sqrt{10}, \pm 3\sqrt{2}, \ldots$ $\pm 5\sqrt{2}, \ldots \pm 7\sqrt{2}$ | 8 | 42 | 2,436 | 58.0 |
| 256-QAM | $\pm\sqrt{2}, \ldots \pm 15\sqrt{2}$ | 16 | 170 | 40,324 | 237.2 |

Calculation of the moment ratio R may distinguish between modulation by constellation types. The moment ratio may also distinguish M levels within a constellation type (except PSK). An algorithm may include comparing the moment ratio to a threshold for distinguishing between two types of constellations. Alternatively, the thresholding operation may be generalized by comparing the moment ratio to a series of threshold values to identify the constellation type and/or its level among several candidates.

FIG. 4 shows a block diagram for the algorithm to determine the constellation type according to a first specific embodiment of the present invention. The algorithm 30 receives an incoming signal 32 into an amplifier 34. The amplified signal may be digitized in an analog-digital converter (ADC) 36. The digital signal may be separately input into a second order power (or squaring) function 38 and a fourth order power function 40. The second and fourth order power functions 38 and 40 may be considered equivalent to a first low pass filter (LPF) to perform the expected value function. The squared value from the function 38 may be input to a ratio-inverter 42 (taken to the −1 power).

The smoothed fourth order and inverted squared values may then be input to a multiplier 44 to produce a moment ratio R in a ratio store 46. A threshold value T may be provided in a threshold store 48. The moment ratio R and threshold T may be input to a logical comparer 50. If the moment ratio R is lower than the threshold T, the comparer 50 may indicate a first constellation condition 52. By contrast, if R is higher than T, the comparer 50 may indicate a second constellation condition 54. A concatenated series of threshold values may be compared with the moment ratio in order to distinguish between several constellation types.

The procedure of determining the constellation type may be further simplified in a second embodiment of the present invention. By employing an automatic gain control, the power level (represented by the expected value function of the square of the point distance or moment) may be normalized to the highest power value among the expected modulation techniques. From the constellation list in Table 1, the highest power level is 170, corresponding to 256-QAM. The point distance d for each constellation type may be multiplied by a coefficient a in order to normalize each power function $E(d^2)$ to a value of 170. This normalizing operation may be performed by automatic gain control (AGC). The AGC system for a multi-constellation type receiver may adjust the incoming signal power and ADC input range irrespective of signal modulation type. Thus, the incoming signal power may be uniform regardless of the input constellation.

A comparison of expected value functions and the moment ratio for selected modulations is shown in Table 2.

Each constellation type includes the number of constellation points M and modulation technique. The constellation type is described by coefficient a, the expected value function of the coefficient and distance product, the function with respect to the square of the product, the unction with respect to the fourth power of the product, and the moment ratio.

TABLE 2

| Const. Type | a | E(\|a · d\|) | E([a · d]²) | E([a · d]⁴) | R |
|---|---|---|---|---|---|
| 2-PSK | 9.220 | 13.0 | 170.0 | 28,905.7 | 170.0 |
| 4-PSK | 9.220 | 18.4 | 170.0 | 28,905.7 | 170.0 |
| 8-PSK | 9.220 | 15.7 | 170.0 | 28,905.7 | 170.0 |
| 4-PAM | 5.831 | 11.7 | 170.0 | 47,397.6 | 278.8 |
| 8-PAM | 2.845 | 11.4 | 170.0 | 50,932.4 | 299.6 |
| 16-PAM | 1.414 | 11.3 | 170.0 | 51,746.0 | 304.4 |
| 16-QAM | 4.123 | 16.5 | 170.0 | 38,144.1 | 224.4 |
| 64-QAM | 2.012 | 16.1 | 170.0 | 39,919.9 | 234.8 |
| 256-QAM | 1.000 | 16.0 | 170.0 | 40,324.0 | 237.2 |

The multiplication of power normalizing coefficient a by the distance d may produce a factored moment. The incorporation of the factored moment in the expected value function may eliminate the division of the fourth order function by the second order function, since the latter may be normalized as a constant value. A comparison to a threshold may be made either to the fourth order function, or to a moment ratio composed of the fourth order function divided by a constant power value. Consequently, the complexity of the algorithm for determining the constellation type in the second specific embodiment may be reduced from the first specific embodiment.

FIG. 5 shows a block diagram for the algorithm to determine the constellation type according to the second specific embodiment of the present invention. The algorithm 60 receives an incoming signal 62 into a normalizing amplifier 64. The amplified signal may be digitized in an ADC 66. The digital signal may be input into a fourth order power function 68 (such as an LPF) to produce a value 70 that may be termed a moment ratio.

A threshold value T may be provided in a threshold store 72. The moment ratio R and threshold T may be input to a logical comparer 74. If the value 70 is lower than the threshold T, the comparer 74 will indicate a first constellation condition 76. By contrast, if the value 70 is higher than T, the comparer 74 may indicate a second constellation condition 78. A concatenated series of threshold values 72 may be used to compare with the value 70 in order to distinguish between several constellation types.

The normalized moment ratio may be readily segregated by constellation type. The moment ratio for M-PSK in Table 2 is 170. The moment ratio for M-QAM in Table 2 lies between 220 and 240. The moment ratio for M-PAM in Table 2 lies between 270 and 310. The moment ratio may be compared to a threshold to distinguish between two types of constellations.

For example, a first threshold value of 200±20 may be employed for deciding between PSK and QAM constellations, with values below the first threshold corresponding to PSK and values above being either QAM or PAM. Alternatively, a second threshold value of 260±10 may be considered to distinguish QAM and PAM constellations, with values above the second threshold corresponding to PAM.

The thresholding operation may be generalized by comparing the moment ratio to a series of threshold values to identify the constellation type among several modulation candidates. The M number of points may be determined by further thresholding for narrower differences between threshold values.

While embodiments and applications of this invention have been shown and described, it would be apparent to those skilled in the art having the benefit of this application that many more modifications than mentioned above are possible without departing from the inventive concepts herein. The invention, therefore, is not to be restricted except in the spirit of the appended claims.

What is claimed is:

1. A method to determine a signal constellation type for a signal having M digital waveforms from 1, 2, . . . M, said method comprising:

establishing a moment for the M digital waveforms;

squaring said moment to produce a power moment;

calculating a fourth power of said moment to produce a variance moment;

dividing said variance moment by said power moment to produce a moment ratio; and comparing said moment ratio to a threshold, wherein the signal constellation type corresponds to a first modulation if said moment ratio is less than said threshold and to a second modulation if said moment ratio is greater than said threshold.

2. A method according to claim 1 wherein said threshold is between 2.0 and 8.2, said first modulation is M-PSK and second modulation is 4-PAM, wherein M is taken from a group consisting of 2, 4 and 8.

3. A method according to claim 1 wherein said threshold is between 8.2 and 13.2, said first modulation is 4-PAM and second modulation is 16-QAM.

4. A method according to claim 1 wherein said threshold is between 13.2 and 37.0, said first modulation is 16-QAM and second modulation is 8-PAM.

5. A method according to claim 1 wherein said threshold is between 37.0 and 58.0, said first modulation is 8-PAM and second modulation is 64-QAM.

6. A method according to claim 1 wherein said threshold is between 58.0 and 152.2, said first modulation is 64-QAM and second modulation is 16-PAM.

7. A method according to claim 1 wherein said threshold is between 152.2 and 237.2, said first modulation is 16-PAM and second modulation is 256-QAM.

8. A method according to claim 1 wherein said averaging said power moments further includes:

normalizing said average power moment to a uniform value.

9. A method according to claim 8 wherein said uniform value is 170.0.

10. A method according to claim 9 wherein said threshold is between 170.02 and 224.2, said first modulation is $M_1$-PSK and second modulation is $M_2$-QAM, wherein $M_1$ is taken from a group consisting of 2, 4 and 8 and $M_2$ is taken from the group consisting of 16, 64 and 256.

11. A method according to claim 9 wherein said threshold is between 237.2 and 278.8, said first modulation is $M_1$-QAM and second modulation is $M_2$-PAM, wherein $M_1$ is taken from a group consisting of 16, 64 and 256 and $M_2$ is taken from the group consisting of 4, 8 and 16.

12. A method according to claim 9 wherein said threshold is between 170.02 and 224.2, said first modulation is M-PSK and second modulation is 16-QAM, wherein M is taken from a group consisting of 2, 4 and 8.

13. A method according to claim 9 wherein said threshold is between 224.2 and 234.8, said first modulation is 16-QAM and second modulation is 64-QAM.

14. A method according to claim 9 wherein said threshold is between 234.8 and 237.2, said first modulation is 64-QAM and second modulation is 256-QAM.

15. A method according to claim 9 wherein said threshold is between 237.2 and 278.8, said first modulation is 256-QAM and second modulation is 4-PAM.

16. A method according to claim 9 wherein said threshold is between 278.8 and 299.6, said first modulation is 4-PAM and second modulation is 8-PAM.

17. A method according to claim 9 wherein said threshold is between 299.6 and 304.4, said first modulation is 8-PAM and second modulation is 16-PAM.

18. A method to determine a signal constellation type for a signal having M digital waveforms from 1, 2, . . . M, said method comprising:

establishing a moment for the M digital waveforms;

normalizing said moment to produce a factored moment based on a normalized power moment;

calculating a fourth power of said factored moment to produce a normalized variance moment; and comparing said normalized variance moment to a threshold, wherein the signal constellation type corresponds to a first modulation if said normalized variance moment is less than said threshold and to a second modulation if said normalized variance moment is greater than said threshold.

19. A method according to claim 18 wherein said normalizing is performed by an automatic gain control amplifier.

20. A method according to claim 18 wherein normalized power moment is 170.

21. A method according to claim 20 wherein said threshold is between 28,905.7 and 38,144.1, said first modulation is $M_1$-PSK and second modulation is $M_2$-QAM, wherein M1 is taken from a group consisting of 2, 4 and 8 and $M_2$ is taken from the group consisting of 16, 64 and 256.

22. A method according to claim 20 wherein said threshold is between 40,324.1 and 47,397.6, said first modulation is $M_1$-QAM and second modulation is $M_2$-PAM, wherein $M_1$ is taken from a group consisting of 16, 64 and 256 and $M_2$ is taken from the group consisting of 4, 8 and 16.

23. A method according to claim 20 wherein said threshold is between 28,905.7 and 38,144.1, said first modulation is M-PSK and second modulation is 16-QAM, wherein M is taken from a group consisting of 2, 4 and 8.

24. A method according to claim 20 wherein said threshold is between 38,144.2 and 39,919.9, said first modulation is 16-QAM and second modulation is 64-QAM.

25. A method according to claim 20 wherein said threshold is between 39,920.0 and 40,324.0, said first modulation is 64-QAM and second modulation is 256-QAM.

26. A method according to claim 20 wherein said threshold is between 40,324.1 and 47,397.6, said first modulation is 256-QAM and second modulation is 4-PAM.

27. A method according to claim 20 wherein said threshold is between 47,397.7 and 50,932.4, said first modulation is 4-PAM and second modulation is 8-PAM.

28. A method according to claim 20 wherein said threshold is between 50,932.5 and 51,746.0, said first modulation is 8-PAM and second modulation is 16-PAM.

* * * * *